May 25, 1965 G. A. LOVEALL, JR., ETAL 3,185,346
MATERIAL FLOW SENSING AND CONTROL DEVICE
FOR BELT-TYPE CONVEYORS
Filed Feb. 6, 1962 2 Sheets-Sheet 2

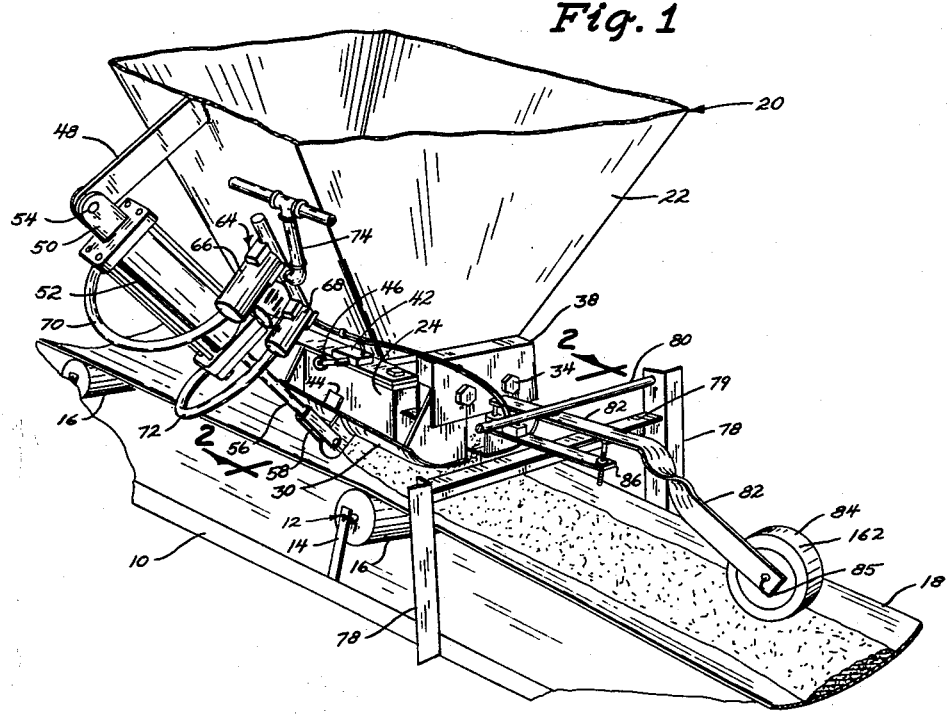

INVENTORS
GEORGE A. LOVEALL, JR.
BY EARL E. DAVIS

Donald H. Zorley
ATTORNEY

United States Patent Office 3,185,346
Patented May 25, 1965

3,185,346
MATERIAL FLOW SENSING AND CONTROL DEVICE FOR BELT-TYPE CONVEYORS
George A. Loveall, Jr., and Earl E. Davis, Waterloo, Iowa, assignors to Engineered Equipment, Inc., Waterloo, Iowa, a corporation of Iowa
Filed Feb. 6, 1962, Ser. No. 171,500
3 Claims. (Cl. 222—55)

There are many instances in the industrial world when it becomes important and even necessary to measure or otherwise determine the amount of material being supplied to or delivered by a given conveyor belt. This is frequently the case in the "ready-mix" concrete plants where the dry ingredients of the final concrete mixture are either delivered by a plurality of belts to the mixing area, or are deposited on a single belt at intermittent points. These and other similar operations obviously require absolute control of the quantity of material either being delivered by or supplied to a given conveyor belt.

Therefore, the principal object of our invention is to provide a material flow sensing and control device for belt-type conveyors which can sense the quantity of material moving with a conveyor belt and which can thereupon respond to control any adverse material flow conditions.

A further object of our invention is to provide a material flow sensing and control device for belt-type conveyors which will not adversely affect or disturb the material moving on a conveyor belt as the sensing elements are functioning.

A still further object of our invention is to provide a material flow sensing and control device for belt-type conveyors which can sense and maintain desired flow conditions, and which can increase or decrease the flow of material on a conveyor belt whenever the flow of material is deficient or excessive, respectively.

A still further object of our invention is to provide a material flow sensing and control device for belt-type conveyors that will automatically open the control circuitry when the gates on the material supply hoppers completely open as the hoppers become empty.

A still further object of our invention is to provide a material flow sensing and control device for belt-type conveyors that can be easily adapted to existing material supply and conveyor belt equipment.

A still further object of our invention is to provide a material flow sensing and control device for belt-type conveyors that is economical of manufacture and durable in use.

These and other objects will be apparent in those skilled in the art.

Our invention consists in the construction, arrangements, and combination, of the various parts of the device, whereby the objects contemplated are attained as hereinafter more fully set forth, specifically pointed out in our claims, and illustrated in the accompanying drawing, in which:

FIG. 1 is a perspective view of our device installed on a typical material hopper or bin and a conventional conveyor belt system;

FIG. 2 is an elevational view of the hopper or bin structure and related components as viewed on line 2—2 of FIG. 1;

Figure 3:
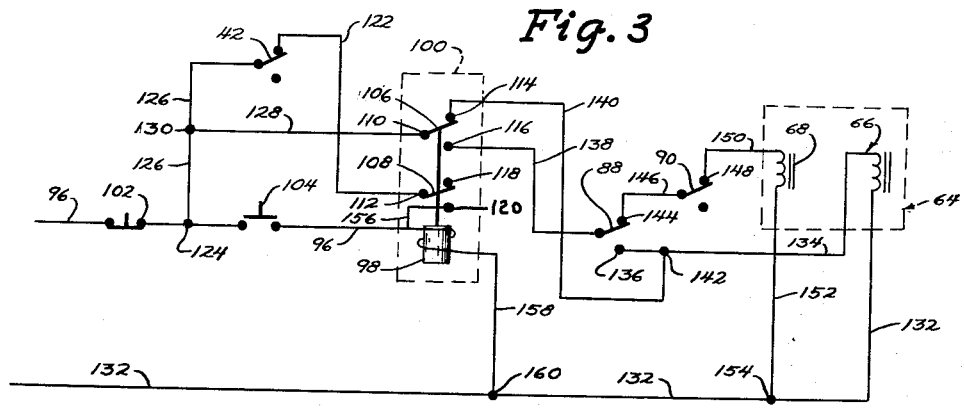
FIG. 3 is a schematic wiring diagram of the circuitry whereby our device senses and controls the equiment upon which it is installed.

We have used the numeral 10 to generally designate a conveyor belt supporting frame with groups of idler brackets 12 secured thereto with arms 14 extending upwardly therefrom. Idler elements 16 are rotatably secured between the upper ends of arms 14 in conventional fashion, and a conveyor belt 18 extends over and is supported on the groups of idler elements. The belt 18 is operatively connected to a power mechanism (not shown) to cause the belt to move over the idler elements 16. In conventional fashion, the idler elements 16 hold the belt 18 in a "cupped" position so that the upwardly extending edges of the belt can maintain material on the center portion of the belt.

A bin or hopper 20 is supported in any convenient fashion over belt 18. The supporting structure for the bin has not been shown. The bin walls 22 taper downwardly and inwardly and terminate in a rectangular vertical chute 24. The open bottom of the chute 24 is closed at times by clam gates 26 and 28. The gates can assume a variety of designs but we have shown gates 26 and 28 of conventional construction which are comprised of arcuate shell bottoms 30 extending between tapered vertical end portions 32. The upper ends of end portions 32 are pivotally connected to the vertical chute 24 by pins 34. Teeth 36 on the end portions 32 intermesh so that pivotal movement of gate 26 about its supporting pin will cause the gate 28 to pivot in an opposite direction on its supporting pin. As shown in FIG. 1, a cover element 38 is mounted on pins 34 to protect the upper end portions of the gates 26 and 28. A flange 40 extends outwardly from the bottom of bin 20 to serve as a means of support for micro switch 42. A bracket 44 is welded or otherwise secured to gate 26 and is adapted to engage plunger 46 on micro switch 42 to actuate the switch when the gate 26 is moved to its extreme open position.

An arm 48 is welded by one of its ends to bin 20. The other end thereof extending outwardly from the bin is received between ears 50 on double acting air cylinder 52. The outer end of arm 48 is pivotally secured to ears 50 by pin 54. Cylinder 52 extends downwardly from arm 48, and piston rod 56 slidably extends from the lower end of the cylinder. The lower and outer end of piston rod 56 terminates in clevis 58 which receives ear 60, which in turn is welded to gate 26. Pin 62 pivotally connects clevis 58 and ear 60. Gates 26 and 28 are adapted to be in the closed position shown by the solid lines in FIG. 2 when piston rod 56 is in its extreme extended position. Conversely, the gates 26 and 28 move to the extreme open position shown by the dotted lines in this same figure when the piston rod is substantially withdrawn into the cylinder 52.

A conventional double solenoid air valve 64 is secured to bin 20 or otherwise mounted in the close proximity of air cylinder 52. Valve 64 is of conventional construction, such as those manufactured by the Numatics Inc. Company of Highland, Michigan, wherein separate solenoids 66 and 68 operate an internally mounted piston whereby compressed air can be introduced through valve 64 into one end or the other of cylinder 52. Hoses 70 and 72 connect the upper and lower ends, respectively, with the valve 64, which in turn is secured to a source of air pressure by conduit 74. Valve 64 is internally vented in conventional fashion so that when both solenoids are unexcited, air will neither flow into or out of the ends of cylinder 52 whereby piston rod 56 will temporarily assume a fixed position. Then, as one of the solenoids is excited to move the internally mounted piston, compressed air is introduced into one end of the cylinder 52 and the other end thereof is automatically vented. A spring will always move the piston back to its original position when the circuit to the excited solenoid is broken. As will be shown hereafter, at no time will both of the solenoids be excited at the same time. The excitement of the second solenoid will merely reverse the phenomenon described above when the first solenoid was excited, and air will thereupon be introduced into the other end of the cylinder 52 as the first end of the cylinder is automatically vented. Since valves of this general character are available on the market today, and since the precise construction thereof does not, of itself, constitute our invention, the specific details thereof have not been shown.

Figure 4:
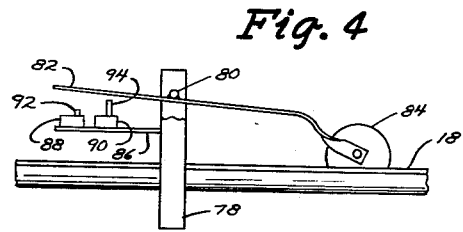
FIG. 4 is an elevational view of the sensing structure when the conveyor belt is empty or when the conveyor belt contains less material than the desired flow conditions.
Figure 5:
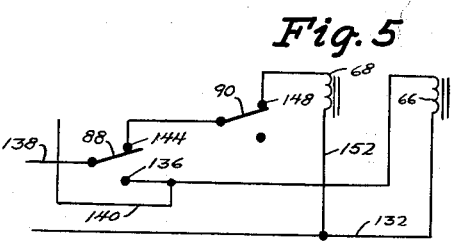
FIG. 5 is a wiring diagram showing the positions of the two sensing switches when the conveyor belt contains less material than the desired flow conditions.
Figure 6:
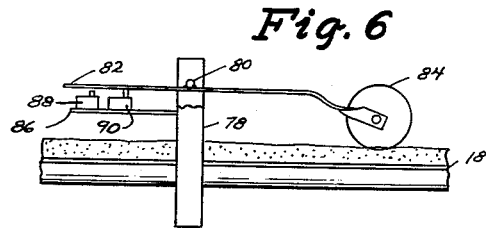
FIG. 6 is an elevational view of the sensing structure when the conveyor belt is flowing material at the desired capacity.

Vertical angles 78 are welded or otherwise secured to opposite sides of frame 10 adjacent bin 20. A horizontal bar 79 extends between angles 78 at a point above belt 18. A horizontal rod 80 is pivotally secured to the upper ends of angles 78 and is adapted for rotation about its longitudinal axis. A flat bar 82 is welded to rod 80 at a point between the center and the rearward end of the bar. Bar 82 is normally in a substantially horizontal position, but the forward end thereof is twisted 90 degrees and bent downwardly to serve as a bearing means for wheel 84. Wheel 84 is secured to the forward lower end of bar 82 by pin 85. The weight of wheel 84 normally causes the bar 82 and rod 80 to pivot so that the wheel will move downwardly towards the bottom center portion of belt 18. A bar 86 is secured to bar 79 and extends underneath the rearward end of bar 82. Micro switches 88 and 90 with upwardly extending plungers 92 and 94, respectively, are mounted on bar 82. The proportionate lengths of plungers 92 and 94 have been slightly exaggerated in FIGS. 4 to 6 to illustrate that the downward rotational movement of the rearward end of bar 82 will actuate the switch 90 before switch 88 is actuated. Switch 88 is a two-position switch which is normally closed in one direction but which closes on a second terminal as plunger 92 is depressed. Switch 90 is normally closed and becomes open as plunger 94 is depressed. The bar 82 engages neither of the switches when the belt 18 is empty or is flowing less material than desired. At the desired flow conditions, the material in the belt 18 moves wheel 84 upwardly and the rearward end of bar 82 moves downwardly to open switch 90. If the material in the belt exceeds the desired quantity of flow, the bar 82 will be caused to pivot further and will actuate the plunger 92 on switch 88 during this "overflow" condition.

With reference to FIG. 3, a positive power line 96 is connected to a source of electrical energy and extends to one side of solenoid 98 in holding relay 100. A control switch 102 and a starting switch 104 are imposed in line 96. Holding relay 100 has two switches or toggles 106 and 108 which are electrically connected to terminals 110 and 112, respectively. Switch 108 is normally closed on terminal 114 but will close in conventional fashion on terminal 116 when solenoid 98 is electrically excited. Similarly, switch 108 is normally closed on terminal 118 but will close on terminal 120 when solenoid 98 is electrically excited. Line 122 connects terminal 112 on switch 108 with the closed side of the normally closed micro switch 42 on bin 20. The other side of switch 42 is connected to line 96 between switches 102 and 104 at junction 124 by line 126. Line 128 connects terminal 110 of switch 106 in holding relay 100 with line 126 at junction 130.

One side of solenoid 66 on valve 64 is connected to the negative power line 132. The other side of solenoid 66 is connected by line 134 to terminal 136 of micro switch 88 which is mounted on bar 86. Line 138 connects switch 88 with terminal 116 of switch 106 in holding relay 100. Terminal 114 of switch 106 is connected by line 140 to line 134 at junction 142. Switch 88 is normally closed on its terminal 144 but closes on terminal 136 when bar 82 depresses plunger 92 on the switch. Line 146 connects terminal 144 of switch 90 which is normally closed on terminal 148 thereof until opened by bar 82. Line 150 connects terminal 148 with one side of solenoid 68 on valve 64, and the other side of the solenoid is then connected to negative power line 132 by line 152 at junction 154. As also shown in FIG. 3, terminal 120 of switch 108 in holding relay 100 is connected to power line 96 by line 156 at a point between switch 104 and solenoid 98. As indicated above, one side of solenoid 98 is connected to power line 96 and the other side of the solenoid is connected to power line 132 by line 158 at junction 160.

The normal operation of our device is as follows: The power mechanism associated with belt 18 can be started so that the belt will begin to move on idlers 16 in the conventional fashion. The cross sectional area of the "cupped" belt is predetermined as is the speed of the belt, and the depth of a given material on the belt can be mathematically computed for a given desired rate of flow. As material flows onto the moving belt, the wheel 84 will float on the surface thereof and will automatically and instantaneously sense any change in the depth of the material. As was indicated heretofore, the component parts of the sensing equipment are so located that bar 82 will not engage either of the switches when the material is flowing at less than the desired depth; the bar 82 will actuate the switch 90 when the desired depth of material is attained; and both switches 88 and 90 will be actuated by bar 82 if the material exceeds the desired depth.

The hopper 20 is filled with the material to be moved, and the gates 26 and 28 at the bottom thereof are closed as the operation is begun. The circuitry initially is as shown in FIG. 3 except control switch 102 is open. The closing of the control switch 102 when the starting switch 104 is open serves to keep the gates 26 and 28 closed until the material sensing circuitry and equipment are made operational by the closing of starting switch 104. As switch 102 closes, a circuit is created through the switch, line 96, junction 124, line 126, junction 130, line 128, switch 110, line 140, junction 142, line 134, solenoid 66 and back to negative power line 132. As solenoid 66 becomes energized, valve 64 permits an onrush of compressed air into the upper end of cylinder 52 through hose 70. This extends piston rod 56 and holds the gates 26 and 28 in a closed condition. When control switch 102 and starting switch 104, which can be positioned on a conveniently located control board, are both closed, solenoid 98 in holding relay 100 is immediately energized. The energized solenoid 98 thereupon causes switch 106 to close on terminal 116 and switch 108 to close on terminal 118. Switch 104 is normally open and moves to an open position as soon as manual pressure is released therefrom. However, after switch 104 has been momentarily closed and then opened, the solenoid 98 in the holding relay 100 continues to be energized by a circuit defined through line 126 from power line 96, thence through closed micro switch 42, thence through line 122 to switch 108, which is then closed on terminal 120, thence through line 156 and one end of line 96, thence through the solenoid and back to negative power line 132 through line 158.

As soon as the holding relay 100 is energized in the manner described, a "gate opening" circuit is created from power line 96 to junction 124, thence through line 126 to junction 130, thence through line 128 to holding relay switch 110 which is then closed on terminal 116, thence through line 138 to switch 88 which is then still closed on terminal 144 since it has not been actuated by sensing bar 82, thence through line 146 to switch 90 which is also still in its normally closed condition; thence through line 150, solenoid 68 and line 152 and back to negative power line 132 at junction 154. As solenoid 68 is energized, it opens valve 64 to permit the onrush of compressed air into the lower end of cylinder 52 through hose 72, while at the same time venting the upper portion of the cylinder to the atmosphere through hose 70 and an internal port in the valve. This action causes piston rod 56 to withdraw and the gates 26 and 28 are pivoted in the manner described, and begin to open. The material in hopper 20 then begins to pass from the hopper onto belt 18.

As the moving belt begins to fill with material, the wheel 84 rolls over the surface of the moving material. The rotating wheel offers little resistance to the material, and the area 162 on the periphery of the wheel causes the wheel to float with the depth variations of the material being deposited on and moved with the belt. When the depth of the material reaches a predetermined amount which defines the desired quantity of flow, the wheel 84 moves upwardly and causes the rearward ends of bar 82 to rotate slightly downwardly to depress plunger 94 on switch 90 which serves to open the switch. At that instant, solenoid 68 becomes de-energized and the valve 64 assumes its neutral position wherein neither end of the cylinder 52 is being vented and neither end of the cylinder is receiving an on-rush of compressed air. This holds the piston rod 56 in a stationary position which also holds the gates 26 and 28 in a partially open position. If the material in hopper 20 should have its flow onto the belt slowed for any reason, the wheel 84 would immediately sense the decrease in depth of the material on the belt; the wheel would then become lowered to raise the rearward end of bar 82 from engagement with switch 90, and the switch 90 would then automatically close to "make" again the above described "gate opening" circuit. Thus, the gates 26 and 28 would open wider until the decrease in flow was overcome and the sensing unit of wheel 84 and bar 82 again would cause the gates to stop opening as bar 82 pivoted to open switch 90.

Figure 7:
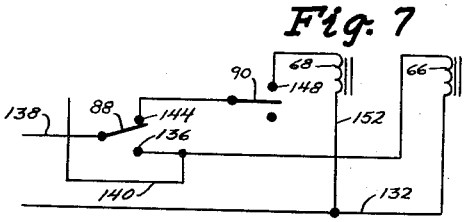
FIG. 7 is a wiring diagram showing the positions of the two sensing switches when the conveyor belt is flowing material at the desired capacity.
Figure 8:
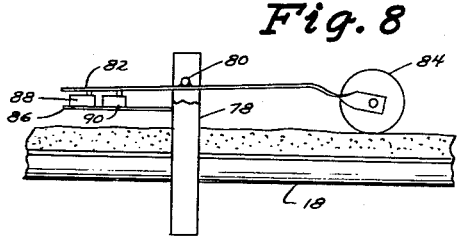
FIG. 8 is an elevational view of the sensing structure when the conveyor belt is flowing material at a capacity greater than that which is desired.
Figure 9:
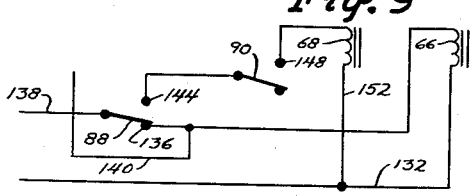
FIG. 9 is a wiring diagram showing the positions of the two sensing switches when the conveyor belt is flowing material at the desired capacity.

In the event that too much material was deposited on belt 18, wheel 84 and bar 82 would be urged by the material into the position shown in FIG. 8 wherein bar 82 engates both switches 88 and 90. This action not only opens switch 90 to cause the gates to cease opening as described above, but switch 88 is closed on terminal 136 as shown in FIG. 9. This creates a "gate closing" circuit which is the same as the above described "gate opening" circuit as the two circuits are traced from power line 96, through the holding relay 100, and thence to switch 88. However, switch 88 is then closed on terminal 136, so that gate closing circuit is then completed through line 134, solenoid 66, and thence to negative power line 132. As solenoid 66 is energized, valve 64 is actuated to allow compressed air to rush into the top of cylinder 52 through hose 70. At the same time, the valve 64, in conventional fashion, vents the lower end of the cylinder to the atmosphere through hose 72, and the piston rod moves to an extend position to close gates 26 and 28. As the gates start to close, the wheel 84 immediately senses the drop in the material depth and the rearward end of the rod 82 is thereupon moved upwardly to a position of disengagement with switch 88. This causes switch 88 to move back to the position shown in FIG. 7 and the "gate closing" circuit is thereupon broken. Valve 64 moves back to its neutral position as solenoid 66 is de-energized, and the switches and sensing equipment stay in the positions shown in FIGS. 6 and 7 as long as the flow of material stays at the desired level. Thus, the closing of the gates is interrupted and the gates 26 and 28 are again held in a partially open position. It should be understood that the change of circuitry shown in FIGS. 5, 7 and 9 can occur instantaneously wherein the gates 26 and 28 may be rapidly and intermittently opening and closing. The above described sensing circuitry will automatically be de-energized when the hopper 20 is empty and no more material is deposited on belt 18. Wheel 18 will immediately sense the drop in depth of material and move to the position shown in FIG. 6 whereupon bar 82 will completely disengage switches 88 and 90. As described above, this action will close the "gate opening" circuit and the gates 26 and 28 will move to the extreme open position shown by the dotted lines in FIG. 2. In this position, gate 26 will engage and open switch 42 which will causes solenoid 98 to become de-energized since starting switch 104 is also in its normally open position. The holding relay 100 will then assume the position shown in FIG. 1 wherein the sensing switches 88 and 90 are by-passed and the closing solenoid 66 is energized to cause the gates 26 and 28 to close in the manner described. The entire circuit is then broken by the manual opening of control switch 102.

From the foregoing, it is seen that our device will accomplish at least all of its stated objectives, and that it will accurately sense and control the flow of material on a conveyor belt without adversely disrupting the material as it is being moved.

Some changes may be made in the construction and arrangement of our material flow sensing and control device for belt-type conveyors without departing from the real spirit and purpose of our invention, and it is our intention to cover by our claims, any modified forms of structure or use of mechanical equivalents which may be reasonably included within their scope.

We claim:

1. In combination,
    a conveyor belt movably mounted on a supporting structure,
    a material supply means,
    movable gate means on said material supply means through which granular material in said material supply means can be deposited on said belt at times,
    an air cylinder means secured to said gate means and adapted to open and close said gate means at times,
    an air valve connected to said cylinder and adapted to introduce compressed air to said cylinder means to cause said gate means to open or close,
    a first solenoid on said air valve to cause said air valve and said cylinder means to open said gate means when said first solenoid is electrically energized,
    a second solenoid on said air valve to cause said air valve and said cylinder means to close said gate means when said second solenoid is electrically energized,
    said air valve adapted to be secured to a source of compressed air,
    a frame over said conveyor belt,
    a material engaging element movably mounted on said frame and extending downwardly onto said belt,
    said material engaging element adapted to be engaged and moved with respect to said frame by material deposited on and moving with said belt,
    first and second switches mounted on said frame in the movable path of said material engaging element and adapted to be sequentially engaged at times by said material engaging element,
    said switches being electrically connected in series with said first solenoid, said second solenoid being electrically connected in series with said first switch and electrically connected in parallel to said second switch and said first solenoid through said first switch,
    said first switch being secured to the positive side of source of electrical energy and said solenoids being connected to the negative side thereof, said material engaging element adapted to engage and open said second switch when an accumulation of material on said belt attains a predetermined depth thereby maintaining said gate means in a partially open position, and said material engaging element adapted to also simultaneously engage said first and second switches when the depth of said material increases beyond said predetermined depth to first effect the disconnection of said second switch from said first switch and thence to connect said second switch to said second solenoid whereby said gate means will be closed; said material engaging element being a wheel rotatably mounted on a bar which is pivotally secured to said frame.

2. In combination, a conveyor belt movably mounted on a supporting structure, a material supply means, movable gate means on said material supply means through which granular material in said material supply means can be deposited on said belt at times, an air cylinder means secured to said gate means and adapted to open and close said gate means at times and to maintain said gate means in a partially open position at times, an air valve connected to said cylinder and adapted to introduce compressed air to said cylinder means to cause said gate means to open or close, a first solenoid on said air valve to cause said air valve and said cylinder means to open said gate means when said first solenoid is electrically energized, a second solenoid on said air valve to cause said air valve and said cylinder means to close said gate means when said second solenoid is electrically energized, said air valve adapted to be secured to a source of compressed air, a frame over said conveyor belt, a bar vertically pivotally mounted intermediate its length on said frame and having a wheel rotatably mounted on one end thereof, said wheel adapted to be engaged and moved with respect to said frame by material deposited on and moving with said belt, first and second switches mounted on said frame in the pivotal path of the other end of said bar and adapted to be sequentially engaged at times by said bar, said first and second switches being electrically connected in series with said first solenoid, said second solenoid being electrically connected in series with said first switch and electrically connected in parallel to said second switch and said first solenoid through said first switch, said first switch being secured to the positive side of a source of electrical energy and said solenoids being connected to the negative side thereof, said bar adapted to engage and open said second switch when an accumulation of material on said belt attains a predetermined depth thereby maintaining said gate means in a partially open position, said bar adapted to simultaneously engage said first and second switches when the depth of said material increases beyond said predetermined depth to first effect the disconnection of said second switch from said first switch and thence to connect said second switch to said second solenoid whereby said gate means will be closed, and a third switch in the movable path of said gate means adapted to be actuated by said gate means when said gate means is in a predetermined open position, said third switch operatively connected to said first switch to cut off the supply of electrical energy thereto upon being actuated by said gate means.

3. In combination, a conveyor belt movably mounted on a supporting structure, said belt being cup-shaped in cross-section, a material supply means having movable gate means thereon adapted to deposit material on said belt, said material being deposited on said belt so as to provide an elevated central portion therein, a frame over said conveyor belt, a material engaging element movably mounted on said frame and extending downwardly onto said belt, said material engaging element adapted to be engaged and moved with respect to said frame by said elevated central portion of said material on said belt, a sensing means on said frame and in the movable path of said material engaging element and adapted to be engaged at times by said material engaging element, said sensing means being responsive to different degrees of engagement with said material engaging element as said material engaging element is moved by different quantities of material moving with said belt, said sensing means being adapted for operative connection to the control element on a supply means adapted to deposit granular material on said belt.

References Cited by the Examiner

UNITED STATES PATENTS

| | | | |
|---|---|---|---|
| 1,460,573 | 7/23 | Church et al. | 222—55 X |
| 2,070,152 | 2/37 | Bennett | 222—503 X |
| 2,428,100 | 9/47 | Soulen | 222—57 X |
| 2,607,830 | 8/52 | Razek | 222—55 X |
| 2,637,434 | 5/53 | Harper | 222—55 X |
| 2,710,128 | 6/55 | Anderson | 222—56 X |
| 3,115,278 | 12/63 | Mylting | 222—56 |

FOREIGN PATENTS 885,126  12/61  Great Britain.

LOUIS J. DEMBO, *Primary Examiner.*

LAVERNE D. GEIGER, HADD S. LANE, *Examiners.*